US005599155A

United States Patent [19]

Röhm et al.

[11] Patent Number: 5,599,155

[45] Date of Patent: Feb. 4, 1997

[54] ATTACHMENT FOR INDUSTRIAL TRUCKS

[75] Inventors: Volker Röhm, Eningen; Gerard Vesin, Reutlingen; Ulrich Freundt, Sonnenbühl, all of Germany

[73] Assignee: Wagner Fördertechnik GmbH, Reutlingen, Germany

[21] Appl. No.: 456,507

[22] Filed: Jun. 1, 1995

Related U.S. Application Data

[63] Continuation-in-part of Ser. No. 72,521, Jun. 4, 1993, abandoned.

[30] Foreign Application Priority Data

Jun. 4, 1992 [DE] Germany .......................... 42 18 416.9

[51] Int. Cl.[6] ...................................................... B65G 1/04

[52] U.S. Cl. .......................... 414/283; 414/607; 414/633; 414/637; 414/665; 414/669; 414/672

[58] Field of Search .................................... 414/607, 608, 414/628, 629, 283, 286, 630, 631, 632, 633, 282, 637, 659, 277, 281, 660, 661, 663, 664, 665, 666, 669, 670, 672, 744.4, 744.5, 744.7, 744.6, 273, 274; 254/2 R; 187/237, 222

[56] References Cited

U.S. PATENT DOCUMENTS 3,106,305 10/1963 Gehring ............................. 414/607 X
3,166,209 1/1965 Haddock, Jr. ........................... 414/670
3,572,530 3/1971 Ohntrupetal .
3,659,733 5/1972 Sinclair et al. ......................... 414/670
3,984,019 10/1976 Brudi et al. ............................ 414/607

FOREIGN PATENT DOCUMENTS 691591 7/1964 Canada ................................. 414/670
1223056 6/1960 France ................................. 414/629
962148 10/1956 Germany .
2351487 4/1975 Germany .
3149002 6/1983 Germany .
3719503 12/1988 Germany .
987637 3/1965 United Kingdom ................... 414/660
990992 5/1965 United Kingdom ................... 414/633
2125003 2/1984 United Kingdom .

OTHER PUBLICATIONS

Soine (Author); Forden Und Heben (Title); Published Jun. 7, 1957; p. 242.

*Primary Examiner*—Frank E. Werner
*Attorney, Agent, or Firm*—McGlew and Tuttle, P.C.

[57] ABSTRACT

An attachment for industrial trucks, especially lift trucks, is designed as a multi-articulated lever mechanism (11), preferably as a three-hinge arm. This is articulated to a support plate (1), which can be locked and/or fixed in a bracket of the industrial truck. The lever arms (5, 6, 7) of the lever mechanism (11) are rotatable in relation to one another in articulated axles (3, 8, 10), and can be driven, individually and/or in a simultaneous movement, at least in the horizontal direction by mechanical, hydraulic and/or electrical devices. A load pickup device (12), which can be used preferably as a pivoting retractable fork, is arranged at the last, freely hanging lever arm (7). At least one of the lever arms (5 or 6 or 7) is adjustable in height along its articulated axle (3 or 8 or 10). The load pickup device (12) can be moved by translatory and/or rotary movement, in a time- and/or movement-optimized manner, to any point in the room, and the need for self-contained drive unit of the vehicle for the attachment is eliminated. Industrial trucks of the simplest design can be rapidly and inexpensively retrofitted with the attachment, and the utility value of the vehicle can be increased.

20 Claims, 5 Drawing Sheets

ATTACHMENT FOR INDUSTRIAL TRUCKS

This is a continuation-in-part application of application Ser. No. 08/072,521, filed Jun. 4, 1993, now abandoned.

FIELD OF THE INVENTION

The present invention pertains to an attachment for industrial trucks, preferably lift trucks, with a support element, which is movable at least in a horizontal plane, and on which a fork-shaped load pickup means is arranged.

BACKGROUND OF THE INVENTION

Industrial trucks, especially lift trucks, are usually equipped corresponding to their intended use, with self-contained stationary devices for performing highly specific functions e.g., for picking up, and handling and transporting loads. These trucks may be designed with, among other things, lifting, telescoping, retractable, and pivoting forks, as well as combinations thereof. This permanently established intended use of these devices represents a completely unnecessary limitation of the possible uses of such industrial trucks, and it extremely reduces their flexibility in use. In addition, each type of movement requires a separate drive, so that a plurality of different drive means must be present in the vehicle. In the case of combined movement processes, which occur, e.g., in the case of the use of a pivoting and retractable fork of a commissioning truck, this leads to a high prime cost of the vehicle.

Since most types of movements of these devices for storing, removing and transferring materials in warehouses are of a purely translatory nature, with the exception of pivoting or rotation, they usually take place in a chronological sequence one after another, especially if they are to continue to be able to be easily surveyed by the operating personnel, as a result of which even extended adjustment distance must be accepted. The movement processes necessary for, e.g., the positioning of the pivoting and retractable fork, such as the principal lifting movement of the operator's cage, the initial fork lifting movement, translatory lateral pushing of the rotating device with the initial lifting frame, rotation or pivoting and synchronous rotation/pushing of the initial lifting frame with load fork, as well as telescoping of the load fork, illustrate the complexity of functions and the associated adjusting operations of such devices. Even travel movement of the entire industrial truck is sometimes necessary for target control for many applications. The resulting, relatively long cycle times of the devices for picking up, depositing or storing, removing and transferring goods needlessly limit the economy of the industrial trucks. In addition, it is absolutely necessary to stop the entire industrial truck for the duration of repair work in the case of malfunction or failure of one of these permanently installed devices.

Moreover, both static and dynamic attachments, e.g., ram attachments, jib type cranes, hooks, bale, barrel or pincer clamps, clamping forks, etc., with which industrial trucks can be retrofitted depending on needs or use, have been known. However, these usually are almost exclusively the load pickup means themselves, which usually have no drive means of their own, which presupposes that these already have to be present on the industrial truck. These attachments are also used almost exclusively for certain special purposes, and they usually do not permit any complicated movement processes, so that they can be used only with limitations.

SUMMARY AND OBJECTS OF THE INVENTION

The basic task of the present invention is therefore to provide—at minimum effort and manufacturing costs, and while avoiding the disadvantages of the aforementioned devices—a universally applicable, easy-to-operate, highly functional attachment with or without independent lifting movement for industrial trucks, even for trucks used exclusively as transport vehicles. This attachment can be rapidly installed and removed, has easy-to-survey movement processes, to which especially the function of a pivoting and retractable fork is to be assigned, and with which both the utility value of the vehicle and the economy will increase, and with which all the movement processes needed for the stacking, commissioning and handling in all directions of loads can be carried out even under crowded space conditions in a minimum amount of time, wherein the need for self-contained drive means of the vehicle for the attachment can be eliminated.

This task is accomplished according to the present invention by the support element being designed as a multi-articulated lever mechanism lockable on the front-side and/or end-side of the industrial truck. Individual lever arms of the lever mechanism are connected to one another via vertical articulated axles, are rotatable in relation to one another by at least 180°, and can be driven along the articulated axles at least in the horizontal direction individually and/or in a in a simultaneous movement, so that the load pickup means can be moved to any point in the horizontal plane by translatory and/or rotary movement in a time- and/or movement-optimized manner.

In principle, all common types of industrial trucks can be retrofitted with the device according to the present invention in a very short time, for which neither specially trained personnel nor expensive devices, let alone corresponding special tools, are needed, and as a result of which the utility value even of industrial trucks of the simplest design can be considerably increased. This is possible because the industrial trucks can subsequently be used for specifically more sophisticated purposes, which are otherwise reserved only for industrial trucks that are of a more complicated design and substantially more expensive, which opens up possibilities for better utilization of the existing vehicle fleet. Due to the possibility of mutually superimposing both the horizontal and the vertical movements of all lever arms, the attachment is able to operate in an absolutely target-optimized manner, i.e., targets can be reached directly in the shortest possible distance, which increases the work efficiency and is reflected by higher load transfer or commissioning performance per unit of time. Since the need for the simultaneous or chronologically consecutive operation of a plurality of drives for initiating different types of movements of the load pickup means by the operator is eliminated, the operator is relieved both physically and psychologically, and is able to concentrate on the actual load pickup or load deposition process. In addition, the attachment is extremely maintenance-friendly and can be replaced with another attachment at any time for repair in the case of malfunction or failure, as a result of which the downtime of the industrial truck can be considerably reduced.

Special variants of the present invention, advantageous characteristics, as well as advantageous improvements of the idea of the present invention are the subject of the additional claims, the specification, as well as the graphic representation of a basic design, as well as of an exemplary embodiment, alone and in combination with one another.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DETAILED DESCRIPTION OF THE PREFERRED EMBODIMENT

Figure 1:
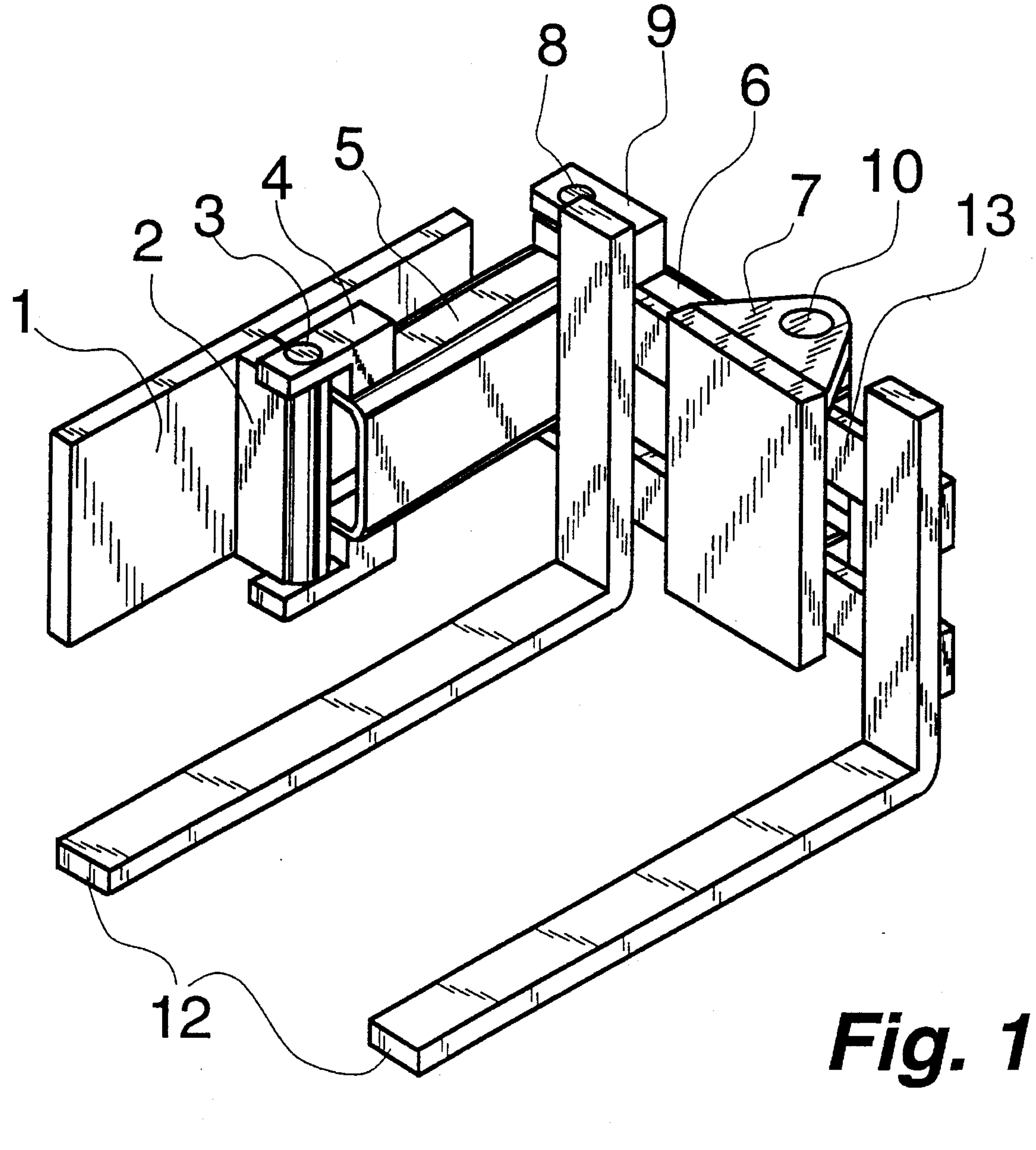
FIG. 1 shows an isometric representation of a basic design of an attachment according to the present invention without independent lifting movement.

As is shown in FIG. 1, a support plate 1 is provided in the middle with a vertical projection 2, which is preferably attached by welding. The support plate 1 defines a shape that can be inserted into a preferably front-side bracket of an industrial truck 47 and can be locked or fixed therein. The shape of the support plate is preferably flat and the bracket shaped accordingly. The bracket and support plate can however be of any shape which provides a secure attachment. The base of the present invention may be an industrial truck without self-contained lifting means, i.e., an exclusive transport vehicle. A lift truck with self-contained lifting means may also be used, using preferably the lifting carriage as a base or support for the support plate 1 in the latter case. It is also possible to arrange the bracket on the industrial truck laterally displaceably and/or pivotably and/or rotatably and/or tiltably.

A first, vertical articulated axle 3, to which a first lever arm 5 of a multi-articulated lever mechanism or means 11 is rotatably articulated, is arranged in the projection 2. First lever arm 5 is connected to first articulated axle 3 by first hinge shoe 4. The lever mechanism 11 is preferably designed as a three-hinge mechanism, but other lever and hinge constellations are also possible, depending on the intended use and the field of use. A second, vertically articulated axle 8, on which a second hinge shoe 9 is located, is provided in the other end of the lever arm 5. A second lever arm 6 is attached, preferably welded, to the hinge shoe 9, and the other end of the second lever arm 6 accommodates a third articulated axle 10. A short support for a load pickup means 12 is mounted on the third articulated axle 10, so to speak as a last, freely hanging third lever arm 7.

The first lever arm has an end positioned substantially in the middle of the support plate and has a length which is longer than half a length of the support plate in order to position the second axle beyond the support plate when the first lever arm is substantially parallel to the support plate. The second lever arm has a length which is substantially of the same order as the magnitude of the length of the first lever arm. The third lever arm is shorter than the length of the first and second lever arms in order to place the load pickup means adjacent opposite sides of the second lever arm by 180 degree rotation of the third lever arm about the third axle. It is also desirable, that the length of the first lever arm be of a magnitude to balance a standard load of a load pickup means at the first axle when the load pickup means is in a resting position with the load pickup means being adjacent to the support plate. The second lever arm should have a length to position the second axle beyond a side of the standard load, when the load pickup means is positioned adjacent the second lever arm. As one can see from FIGS. 4 and 5, the resting position 4 1 has the load of the load pickup means adjacent the support plate, and the lever arms all positioned substantially perpendicular to each other. Such a resting position provides a very compact attachment to the industrial truck, and does not position the load too far away from the industrial truck in order to keep the center of mass substantially centered. In order to balance the load on the first axle, it is desirable that the length of the first lever arm be substantially equal to half a length of the side of the load which is positioned adjacent the support plate. However it is also desirable to skew the load to one side, so that the center of the load is not exactly positioned with the first axle. This is done to compensate for the weight of the lever arms and axles which is in addition to the weight of the load.

The load pickup means 12 is designed as a support fork, whose prongs can be manually and/or automatically adjusted in fork guides 13 to the width of a useful load 14 or to a pallet 15. The load pickup means 12 may also be designed as a telescoping load pickup means, depending on the needs.

The support plate 1, the lever mechanism 11, and the load pickup means 12 together form both a structural unit and a functional unit, which is suitable as a simple attachment for both retrofitting and conversion of industrial trucks.

The articulated axles 3, 8, and 10 can be driven rotatingly separately, for which prior-art, and therefore not specifically described, drive means can be provided of mechanical, hydraulic, or electronic design, which act on the articulated axles 3, 8, and 10 circumferentially and/or frontally. The drive means for each of the articulated axles is preferably located in either the projection 2, the first hinge shoe 4, the first lever arm 5, the second hinge shoe 9, the second lever arm 6, and/or the freely hanging third lever arm 7. It is recommended that the drive means be program-controlled, in which case the industrial truck to be retrofitted and/or the attachment should be equipped with at least one intelligent control circuit or means 46 in the form of a computer, MC, or an SPC (Stored Program Control or known in German as an SPS).

The control means 46 includes a microprocessor 48 with control lines 50, 51 and 52 which lead to the first second and third axles. Control signals are sent from the microprocessor 48 over the control lines to control the amount of rotation about each axle. The control means 46 also has a memory means 49 which stores different programs and data for the microprocessor 48. The microprocessor 48 is able to call up different programs or modes of operation from the memory 49 to control rotation about the axles and eventual movement of the load pickup means in a predefined manner. The programs or modes can be stored either as a sequence of rotations for each of the axles, or as physical parameters of the levers with a program that calculates the rotation needed for each axle in order to perform the desired movement. A user interface 53 is connected to the microprocessor 48 in order to select the mode or program to be performed by the microprocessor.

Figure 3:
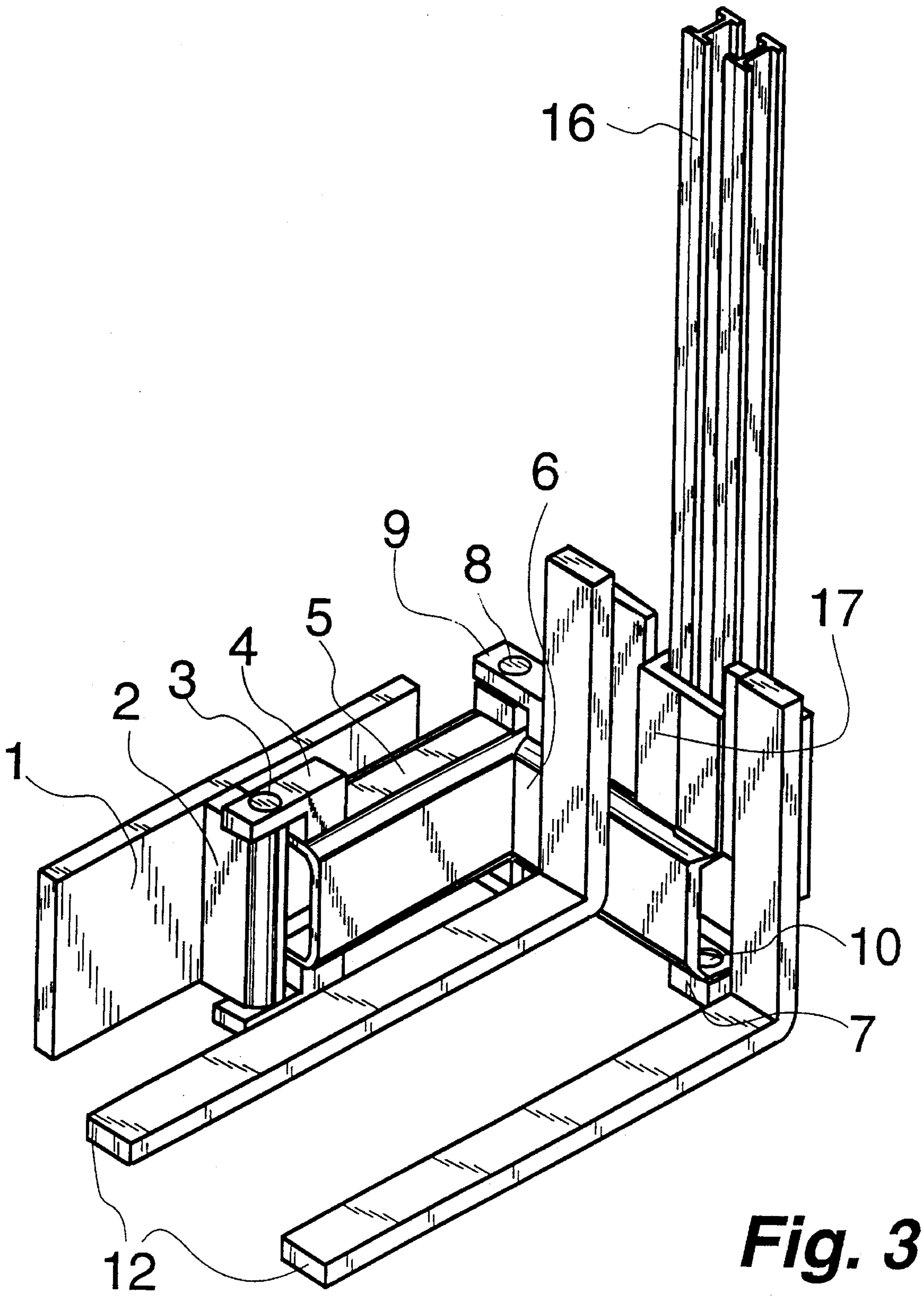
FIG. 3 shows an exemplary embodiment of the attachment with independent lifting movement, in the same view as in FIG. 1.

The above-described basic design of the attachment according to the present invention is designed without independent lifting movement and is consequently dependent on the independent lifting means of the vehicle for changing a height position to reach points or targets in high locations in the room. The exemplary embodiment according to FIG. 3 has an independent lifting movement, so that it is particularly suitable for use as an attachment to exclusively transport vehicles. This independent lifting movement may, of course, also be used as the initial lifting movement if a principal lifting movement can be accomplished within the vehicle.

To achieve the independent lifting movement, at least one of the lever arms 5 or 6 or 7 is designed as a height-adjustable lever arm. The height is changed directly in one or more of the three articulated axles 3 and/or 8 and/or 10. In the exemplary embodiment according to FIG. 3, a lifting frame 16 guides the load pickup means 12 in a vertically movable manner by means of a lifting carriage or means 17, and is preferably arranged on the lever arm 7 in the vertical extension of the articulated axle 10. The lifting frame 16 and the load pickup means 12 are thus rotatable by 180° on the articulated axle 10. All the means of mechanical or hydraulic design, such as chain hoists, cable controls, lifting cylinders, etc., which are commonly used in the manufacture of lift trucks, and are not therefore represented and described in more detail, may be used as lifting drives.

The lever mechanism 11 with the load pickup means 12 may be attached as the sole load bearing implement on the front side or the end side of an industrial truck. If the industrial truck is already equipped with a load bearing implement of its own, this may act as the principal load bearing implement, and the attachment as an auxiliary load bearing implement, which is arranged in this case in the range of action of the principal load bearing implement, preferably under or above same.

Figure 4:
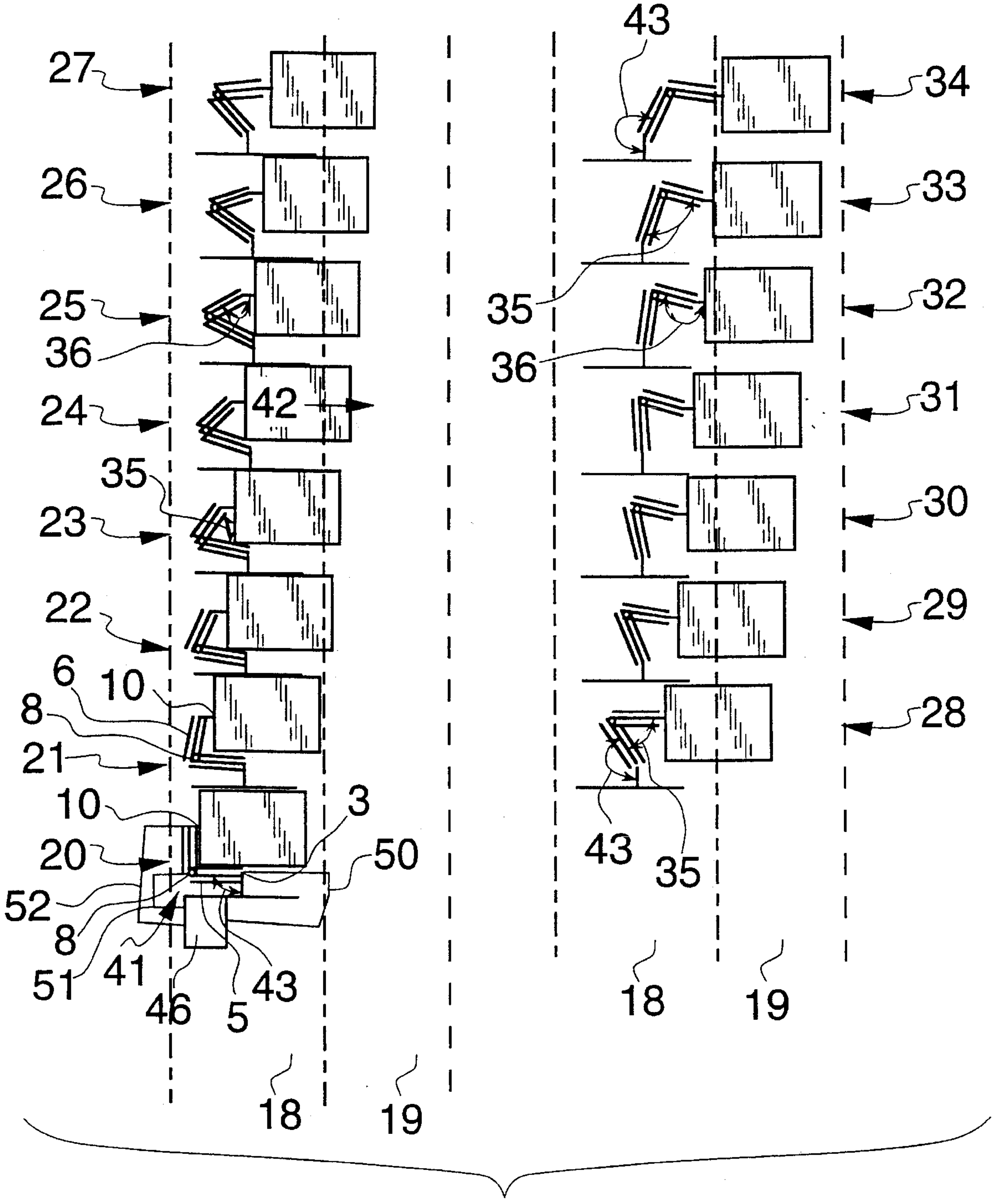
FIG. 4 shows a graphic representation of the movement process of a multi-articulated lever mechanism according to the present invention with simulation of the pushing out of a load pickup means with useful load.
Figure 6:
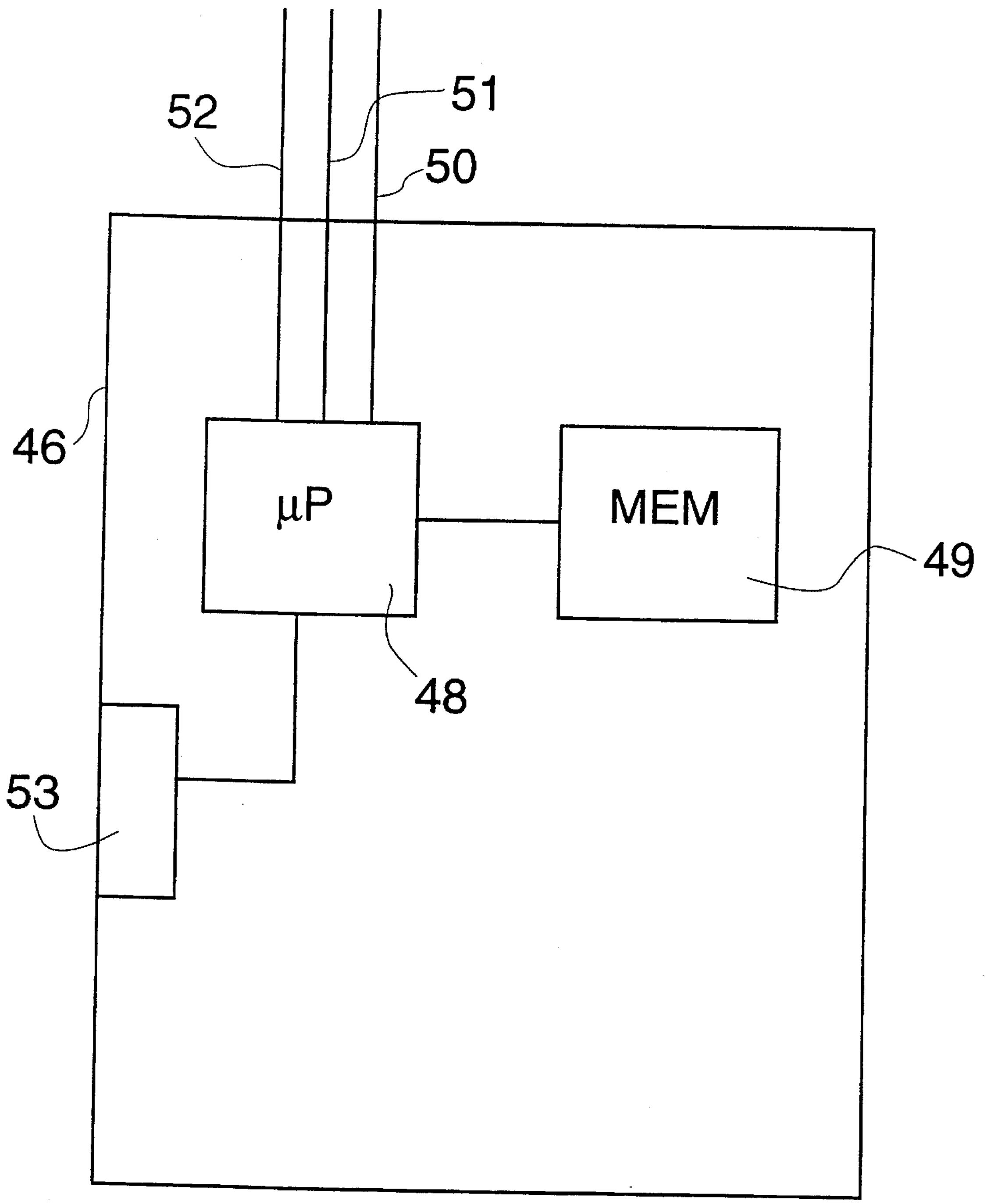
FIG. 6 is a schematic view of a control means for simultaneous coordination of rotation.

FIG. 4 shows graphically the movement process of the load pickup means 12 with a pallet 15 and the useful load 14 located thereon. FIG. 4 contains fifteen simulation steps 20–34 showing a lateral mode where the load is pushed out of an aisle 18 between a row of shelves or stalls, indicated by broken lines, for placement in a storage position in a lateral shelf or stall 19. When the load needs to be moved from a resting position 41 adjacent the industrial truck, and moved only laterally, without rotation, into a position on the shelf 19, the control means 46 calls up the lateral mode or program from the memory 49 and the microprocessor 48 and performs this mode or executes this program. The rotation of the lever arms about the axles, are automatically and simultaneously coordinated to perform this pushing movement, while holding the load rotationally fixed with respect to the industrial truck. As one can see from the steps in FIG. 4, a high degree of coordination is needed among rotation about all three axes in order to convert rotational movement into purely lateral movement. This is also done without substantially moving the load out of a plane parallel to the side of the industrial truck.

Simulation step 20 shows the lever mechanism 11 quasi in a resting position 41 articulated to the industrial truck, when all the lever arms 5, 6, 7 are at right angles in relation to one another. Since the pushing-out movement serves exclusively the purpose of pushing the load pallet 15 with its useful load 14 into the shelf 19 at right angles to the aisle 18 between the shelves, i.e., at an angle of 90°, it must be ensured during the entire movement process that the third lever arm 7 will always be at right angles to the shelf 19. The useful load 14 would otherwise be pushed into the shelf 19 obliquely.

The pushing-out movement is initiated according to simulation step 21 by a slight rotation of the second lever arm 6 to the right around the second articulated axle 8, while the inner opening angle 35 between the first lever arm 5 and the second lever arm 6 slightly decreases. In order for the third lever arm 7 to be able to maintain its position at right angles in relation to the shelf 19, it is necessary to cause it to perform a rotary following movement to the left at the same time around the third articulated axle 10. As a result of the inner opening angle 36 between the second lever arm 6 and the third lever arm 7 will be increased. The load pallet 15 with its useful load 14 is now displaced in the direction of the shelf 19 according to the movement arrow 42.

A rotary movement to the right of the first lever arm 5 around the first articulated axle 3 is additionally superimposed to the movements of the lever arms 6 and 7 during the subsequent simulation step 22, and the outer, right opening angle 43 between the projection 2 and the first lever arm 5 is now increased beyond an original value of 90°. The superimposed movements of the three lever arms 5, 6, 7 are continuously continued in the subsequent simulation steps 23–28 until the opening angle 36 reaches 180° (see simulation step 28), and the third lever arm 7 linearly extends from the second lever arm 6. In this position of the lever mechanism 11, the lever arms 5 and 6 enclose an opening angle 43 of ca. 135° with each other, and the opening angle 35 is ca. 45°. The load pallet 15 with its useful load 14 is now pushed approximately halfway into its storage position on the shelf 19.

It is self-explanatory, so that it does not need to be separately described, that the third lever arm 7 must always perform a following or counteracting movement during a change in the position of one or both of the lever arms 5 and 6 in order to maintain its position at right angles to the shelf 19.

The lever arms 5, 6, and 7 are rotated in the next simulation steps 29–31 to the extent that the now obtuse opening angle 43 between the projection 2 and first lever arm 5 will increase to a straight angle of 180°, which it will exceed at the transition of the simulation step 31 to simulation step 32. In parallel or concurrently hereto, the opening angle 35, which is an acute angle in simulation step 28, tapers toward an angle of 90°, which it will reach approximately between simulation steps 32 and 33. The two lever arms 5 and 6 are now again at right angles to one another, as in the original resting position 41 of the load pickup means 12, but they have been rotated, on the whole, by an angle exceeding 90° in relation to the projection 2 around the first articulated axle 3, and at the same time by a similar angle around the third articulated axle 10 in relation to the third lever arm 7. The load pallet 15 with its useful load 14 is not nearly completely stored in the shelf 19.

The last pushing-out movement of the lever mechanism 11 into the shelf 19 is achieved in simulation step 34 by a slight further rotation of the first lever arm 5 to the right around the first articulated axle 3, as well as by a simultaneous rotation of the second lever arm 6 around the third articulated axle 10, as a result of which the angle 35 is again increased beyond 90°. The load pallet 15 is now pushed completely into its storage position on the shelf 19, and the lever mechanism 11 can be returned in the opposite direction into its original resting position 41.

Figure 5:
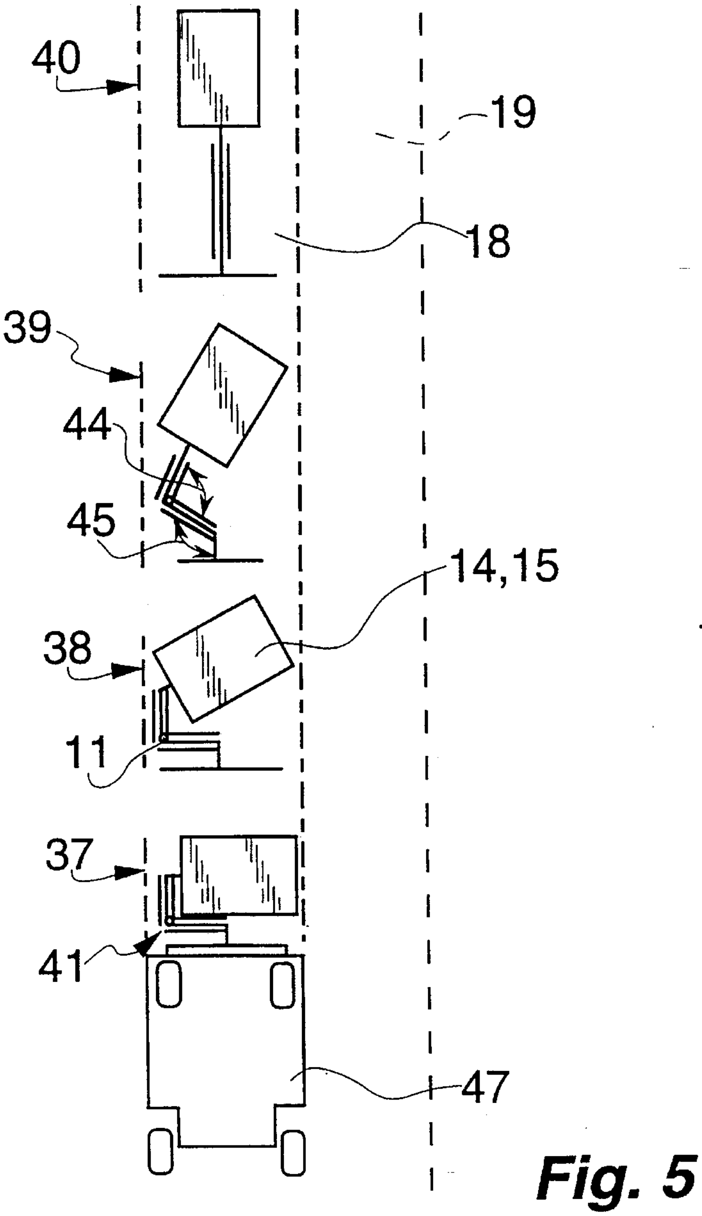
FIG. 5 shows a graphic representation of the movement process of the lever mechanism for synchronous rotation and pushing of the load pickup means with useful load.
Figure 2:
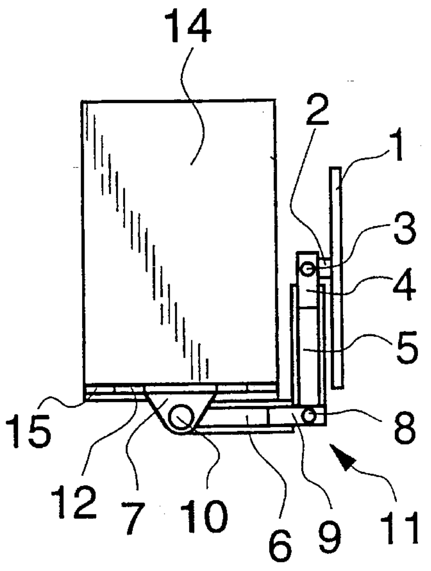
FIG. 2 shows a top view of FIG. 1 with useful load picked up.

FIG. 5 shows a simulation diagram of a reorientation mode where the movement process of lever mechanism 11 is for synchronous rotation and pushing, and simplified in four simulation steps 37–40. A paletted useful load 14 in the aisle 18, removed from the shelf 19 laterally, is now subjected simultaneously to a rotary movement and a pushing movement in order to place the load in a transport position, with all lever arms aligned, and make it possible subsequently to transport same along or out of the aisle 18 between shelves. The coordinated simultaneous rotations needed to perform the reorientation mode are called up from the memory 49 and transmitted over the control lines 50, 51, 52 by the microprocessor 48. These simultaneous coordinated rotations of the lever arms about the axles are chosen so that movement of the load from the resting position to a transport position is performed with the load substantially remaining within the width of the side of the industrial truck, and certainly within the width of the aisle 18. As in the lateral mode, a high degree of coordination is necessary to smoothly move the load between the resting position and the transport position. Such high degree of simultaneous coordination is provided by the control means 46.

Corresponding to the above-mentioned simulation step 20, the simulation step 37 shows the lever mechanism 11 with its load pickup means 12 in the resting position 41, with the useful load 14 being positioned at right angles to the direction of the aisle 18 between shelves. The subsequent simulation step 38 shows the lever mechanism 11 after an exclusive rotary movement of the third lever arm 7 to the left around the third articulated axle 10. The previously begun rotary movement of the third lever arm 7 is continued in the diagram of the subsequent simulation step 39, and a pushing movement of the lever mechanism 11 in the longitudinal direction of the aisle 18 between shelves is at the same time initiated, while the first lever arm 5 is rotated to the right around the first articulated axle 3, and the second lever arm 6 is rotated at the same time in the opposite direction around the second articulated axle 8. The lever mechanism 11 is now stretched out to angles of up to 180°, as is shown in the last simulation step 40, while the articulation angles 44 and 45 open at the same time. The useful load 14 is now positioned in the transport position in the longitudinal direction in relation to the aisle 18 between shelves.

It is also possible for the control means 46 to have an independent mode, where rotation about each of the first second and third axles can be independently controlled by the operator of the industrial truck. This allows the operator to place the load at any position inside a radius equal to the sum of the lengths of all of the lever arms. The operator of the industrial truck can control the rotation of each axle individually and sequentially. It is also possible for the operator to control two or more axles simultaneously. This allows great versatility in the present invention to customize movements for special situations. The presence of the lateral mode and the reorientation mode, allow for quick and easy movements that are performed often, require a high level of coordination and would be very difficult, if not impossible, for an operator to perform manually.

Depending on whether storage or removal targets are located at greater height, corresponding principal lifting or initial lifting movements in the vertical direction, which may, of course, also be carried out separately, can additionally also be superimposed to the above-described movements of the lever mechanism 11 in the horizontal direction. Due to the possibility of simultaneously superimposing lifting and horizontal movements, on the one hand, and of superimposing all movements of the lever arms 5, 6 and 7, on the other hand, it is possible to reach all targets in space not only in a movement-optimized manner, but especially in a time-optimized manner, and the operating personnel will be noticeably relieved at the same time. The possibility of a simple and inexpensive retrofitting with the attachment according to the present invention, which has a maximum of degrees of freedom, increases the flexibility of industrial trucks, while at the same time considerably reducing the costs.

The present invention is not, of course, limited to the embodiments represented in the drawing and described in the specification, which are of an and functional modifications, as well as means that are functionally equivalent in use are within the scope of the present invention. For example, the load pickup means 12 in the lever arm used as a support may additionally or alternatively be designed as a laterally displaceable, rotatable, or tiltable load pickup means, or it is also possible to use other load pickup means of prior-art design instead of the load forks 12. The scope of the present invention to be identified covers not only the use of the attachment as a principal load bearing implement, but it also includes the possibility of using the attachment as an auxiliary load bearing implement under or above the action radius of a principal load bearing implement or, if desired, as an end-side handling means for a front-side load bearing implement.

What is claimed is:

1. An attachment for industrial trucks operating in a narrow side loading and unloading aisle, the attachment comprising:

support plate means for connecting to a side of the industrial truck;

a first axle connected to said support plate;

a first lever arm having an end connected to said support plate by said first axle and rotatable by substantially 180 degrees about said first axle;

a second axle connected to another end of said first lever;

a second lever arm having an end connected to said first lever by said second axle and rotatable by substantially 180 degrees about said second axle;

a third axle connected to another end of said second lever;

a third lever arm having an end connected to said second lever by said third axle and rotatable by substantially 180 degrees about said third axle;

a load pickup means connected to said third lever arm, and for connecting and supporting a load;

first drive means for driving said first lever arm in rotation about said first axle to move said load pickup means with respect to said support plate;

second drive means for driving said second lever arm in rotation about said second axle to move said load pickup means with respect to said support plate;

third drive means for driving said third lever arm in rotation about said third axle to move said low pickup means with respect to said support plate;

control means for controlling said first, second and third drive means and respective said lever arms, said control means having a lateral mode for rotating said lever arms about said axles to substantially only move said load pickup means in a direction substantially parallel to said side of the industrial truck and in a plane adjacent said side of the industrial truck, whereby the industrial truck is able to laterally move loads into and out of a stall through a face of the stall facing parallel to the aisle, the lateral movement of the load being substantially perpendicular to a direction of movement of the industrial truck and the industrial truck moves parallel to the face of the stall.

2. An attachment in accordance with claim 1, wherein:

said control means maintains said load pickup means rotationally fixed with respect to the industrial truck when said control means moves said load pickup means in said lateral mode.

3. An attachment in accordance with claim 1, wherein:

said control means rotates said lever arms to substantially maintain said load pickup means substantially parallel to said plane adjacent said side of the industrial truck when said control means moves said load pickup means in said lateral mode substantially parallel to said side of the industrial truck.

4. An attachment in accordance with claim 1, wherein:

said control means in said lateral mode rotating said first, second and third lever arms to substantially only laterally move said load pickup means between a resting position adjacent the industrial truck and a storage position spaced from the industrial truck without substantial rotation of said load pickup means.

5. An attachment in accordance with claim 1, wherein:

said control means has a reorientation mode for rotating said first, second and third lever arms to substantially synchronously laterally and rotationally move said load pickup means between a resting position adjacent the industrial truck and a transport position spaced from the industrial truck;

said first, second and third lever arms being positioned substantially perpendicular to each other in said resting position;

said first, second and third lever arms being positioned substantially aligned in said transport position.

6. An attachment in accordance with claim 1, wherein:

said control means also has a reorientation mode for moving said load pickup means from a position adjacent said side of the industrial truck to a position spaced substantially perpendicularly from said side and rotated substantially 90 degrees.

7. An attachment in accordance with claim 1, wherein:

said control means also has an independent mode for moving said load pickup means from and to any position within a radius of said first, second and third lever arms under manual control of an operator.

8. An attachment in accordance with claim 7, wherein:

said control means automatically controls rotation of said lever arms in said reorientation mode.

9. An attachment in accordance with claim 1, wherein:

said control means coordinates simultaneous rotation of said first, second and third lever arms in said lateral mode to move said load pickup means in said plane without rotation of said load pickup means.

10. An attachment in accordance with claim 1, wherein:

said control means is one of a computer, microprocessor, and Stored Program Control which contains programs that one of store a sequence of rotations for said first, second and third drive means, and stores physical parameters of said lever arms and calculates an amount of rotation of each of said axles to perform said lateral movement;

said control means automatically controls rotation of said first, second and third lever arms in said lateral mode.

11. An attachment in accordance with claim 1, wherein:

said first axle is positioned substantially in a middle of said support plate;

said first lever arm has a length longer than half a length of said support plate to position said second axle beyond said support plate when said first lever arm is substantially parallel to said support plate;

said second lever arm has a length substantially similar in magnitude to said length of said first lever arm;

said third lever arm has a length shorter than a length of said first and second lever arms to place said load pickup means adjacent opposite sides of said second lever arm by 180 degree rotation of said third lever arm about said third axle.

12. An attachment in accordance with claim 1, wherein:

said first axle is positioned substantially in a middle of said support plate;

said first lever arm has a length to substantially balance a standard load of said load pickup means at said first axle when said load pickup means is in a resting position with said load pickup means adjacent said support plate;

said second lever arm has a length to position said second axle beyond a side of the standard load adjacent said second lever arm when said load pickup means is in said resting position;

said third lever arm has a length shorter than a length of said first and second lever arms to place said load pickup means adjacent opposite sides of said second lever arm by 180 degree rotation of said third lever arm about said third axle.

13. An attachment in accordance with claim 1, wherein:

only said first, second and third lever arm and said first, second and third axle are used to connect said load pickup means to said support plate during moving of said load pickup means during said lateral mode in a direction substantially parallel to said side of the industrial truck.

14. An attachment in accordance with claim 1, further comprising:

lifting means in one of said first, second and third lever arms for moving one end of said one lever arm in a direction of one of said first, second and third axles with respect to another end of said one lever arm, and said moving of said lifting means is superimposable with said rotational movements of said first, second and third lever arms about said first, second and third axles.

15. An attachment in accordance with claim 1, further comprising:

lifting means in one of said first, second and third axles for moving one of said first, second and third lever arms in a direction of said one of said first, second and third axles with respect to another one of said first, second and third lever arms.

16. An attachment in accordance with claim 1, wherein:

said support plate means defines a shape which is insertable into a bracket of the industrial truck.

17. An attachment in accordance with claim 16, wherein:

said bracket is one of adjustable in height, pivotable, tiltable, laterally displaceable and rotatable with respect to the industrial truck.

18. An attachment in accordance with claim 1, wherein:

said first, second, and third axles are substantially parallel.

19. An attachment in accordance with claim 1, wherein:

said first, second and third lever arms are one of mechanically, hydraulicly and electrically movable by one of rotary and vertical movement.

20. An attachment for industrial trucks operating in a narrow side loading and unloading aisle, the attachment comprising:

support plate means for connecting to a side of the industrial truck;

a first axle connected to said support plate and positioned substantially in a middle of said support plate;

a first lever arm having an end connected to said support plate by said first axle and rotatable by substantially 180 degrees about said first axle, said first lever having a length longer than half a length of said support plate to extend beyond said support plate when said first lever arm is substantially parallel to said support plate;

a second axle connected to another end of said first lever;

a second lever arm having an end connected to said first lever by said second axle and rotatable by substantially 180 degrees about said second axle, said second lever arm having a length substantially similar in magnitude to said length of said first lever arm;

a third axle connected to another end of said second lever;

a third lever arm having an end connected to said second lever by said third axle and rotatable by substantially 180 degrees about said third axle, said third lever arm having a length shorter than a length of said first and second lever arms;

a load pickup means connected to said third lever arm, and for connecting and supporting a load, said length of said third lever arm placing said load pickup means adjacent opposite sides of said second lever arm by 180 degree rotation of said third lever arm about said third axle;

means for driving each of said lever arms in rotation about said axles to move said load pickup means with respect to said support plate, said drive means one of mechanically hydraulically and electrically rotates said lever arms;

control means for controlling said drive means and said lever arms, said control means having a lateral mode for rotating said lever arms about said axles to substantially only move said load pickup means in a direction substantially parallel to said side of the industrial truck and in a plane adjacent said side of the industrial truck in one of time and movement optimized manner, whereby the industrial truck is able to laterally move loads into and out of a stall through a face of the stall facing the aisle, the lateral movement of the load being substantially perpendicular to a direction of movement of the industrial truck.

* * * * *